United States Patent

Olin

[15] 3,663,200

[45] May 16, 1972

[54] GRASS SELECTIVE HERBICIDE COMPOSITION

[72] Inventor: John F. Olin, Ballwin, Mo.

[73] Assignee: Monsanto Company, St. Louis, Mo.

[22] Filed: Sept. 26, 1969

[21] Appl. No.: 861,444

Related U.S. Application Data

[63] Continuation-in-part of Ser. No. 793,567, Jan. 23, 1969, Pat. No. 3,547,620.

[52] U.S. Cl. ..........................................71/118, 71/88, 71/92, 71/93, 71/94, 71/100, 71/103
[51] Int. Cl. ..............................................A01n 9/20
[58] Field of Search......................................71/118

[56] References Cited

UNITED STATES PATENTS 3,442,945   5/1969   Olin ........................................260/562

FOREIGN PATENTS OR APPLICATIONS 622,131   12/1962   Belgium ..................................71/118
923,128   4/1963    Great Britain ..........................71/118

Primary Examiner—Lewis Gotts
Assistant Examiner—Catherine L. Mills
Attorney—Paul C. Krizov, Neal E. Willis and David D. Centola

[57] ABSTRACT

Control of grasses, especially barnyard grass in the presence of rice utilizing a selective herbicidal effective amount of N-butoxymethyl-2',6'-diethyl-2-chloroacetanilide and/or N-butoxyethyl-2',6'-diethyl-2-chloroacetanilide.

5 Claims, No Drawings

GRASS SELECTIVE HERBICIDE COMPOSITION

This application is a continuation-in-part application of copending application, Ser. No. 793,567, filed Jan. 23, 1969, and issued as U.S. Pat. No. 3,547,620, on Dec. 15, 1970.

This invention relates to the selective control of grasses, especially barnyard grass in the presence of rice.

The control of grasses in the presence of rice is complicated by the fact that rice is also a grass. The compound utilized for the selective control of grasses in the presence of rice must, in addition to having a greater herbicidal effect on grasses than on rice, have a safety factor; i.e., the herbicidal effect on grasses must be significantly greater than on rice to prevent damage to the rice if an amount greater than the selective herbicidal amount is applied to the rice.

It has now been found that the compounds of this invention—N-butoxyethyl-2',6'-diethyl-2-chloroacetanilide and N-butoxy methyl-2',6'-diethyl-2-chloroacetanilide—possess both the selective herbicidal effect and a significant safety factor. These compounds exhibit their selective herbicidal effect and safety factor both on flooded rice and upland rice and with both pre-emergent and post-emergent application.

Preparation of N-butoxymethyl-2',6'-diethyl-2-chloroacetanilide is outlined in U.S. Pat. No. 3,442,945 and consists in the reaction of 2,6-diethyl-N-methyleneaniline with chloroacetyl chloride followed by reaction with n-butanol according to the following example:

To a suitable vessel charge with 56.5 parts by weight of alpha-chloroacetyl chloride in 230 parts benzene was added over a 5-minute period, with stirring and cooling, 80.5 parts by weight 2,6-diethyl-N-methyleneaniline. The reaction temperature rose to about 60° C. The resultant reaction mixture was cooled to about 30° C and then 81 parts by weight of n-butanol was added followed by 51 parts by weight of triethylamine. The resulting mixture was heated to reflux, with stirring, and the temperature maintained for about 10 minutes. The resultant mixture was cooled, washed with water and the organic phase refluxed with a 10 percent potassium carbonate solution. After the mixture was cooled, it was washed with water and dried over anhydrous magnesium sulfate and filtered. The filtrate was distilled collecting the desired product boiling at 165° C/0.5 mm.

Calc'd for $C_{17}H_{26}ClNO_2$: C, 65.5; H, 8.4; Cl, 11.4
Found: C, 65.6; H, 8.6; Cl, 11.4.

The preparation of 2',6'-diethyl-N-butoxyethyl-2-chloroacetanilide was by the reaction of 2 chloroethylbutyl ether with 2,6-diethylaniline followed by reaction with alpha-chloroacetyl chloride according to the following procedure:

To a suitable vessel was charged 447 parts by weight 2,6-diethylaniline, 272 parts by weight 2-bromoethyl butyl ether and 200 parts by weight acetonitrile. The resulting mixture was refluxed for about 27 hours. The mixture was cooled and 500 parts by weight water added and the resultant mixture distilled until the distillate temperature reached 99° C at which time the mixture was cooled, 320 parts by weight of a 25 percent sodium hydroxide solution was added and the resultant mixture refluxed for about 1 hour. The mixture was cooled, the aqueous layer removed and the organic layer washed with water, dried and distilled collecting the desired amine boiling at 105°–107° C/0.3 mm.

To a suitable vessel charged with 33.9 parts by weight alpha-chloroacetyl chloride and 230 parts by weight benzene was added 70 parts by weight 2,6-diethyl-N-(2-butoxyethyl)aniline followed by 30.1 parts by weight triethylamine. The resultant mixture was refluxed about 10 minutes, cooled and the organic layer washed with water, 5 percent hydrochloric acid and then water. The organic layer was dried and distilled collecting the desired product boiling at 155°–160° C/0.25 mm.

Calc'd for $C_{18}H_{28}ClNO_2$: C, 66.3; H, 8.7; Cl, 10.9.
Found: C, 66.5; H, 8.5; Cl, 11.0.

The selectivety of the compounds of the present invention in inhibiting the growth of barnyard grass in the presence of rice and the significant safety factor exhibited by these compounds is illustrated by the following examples:

Rice seeds are grown in Ray silt loam soil, in small plastic pots, with subirrigation at about 80° F and 75 percent relative humidity until the plants average 6 to 9 inches in height and have two to three leaves. At this time barnyard grass seeds are sown at a depth of about one-eighth to one-fourth of an inch. The pots are then placed in containers and flooded to at least a ¼-inch head of water. The selective herbicide, in 30 ml of solvent-water mixture, is added to the flooded pots. The head of water is allowed to recede for two days to allow germination of the barnyard grass, then the flooded head of water is re-established and maintained for 2 weeks and the plants observed for barnyard grass control and rice inhibition. The results are recorded in Table I.

The numerical data in Table I is defined as follows:

| Numerical Scale | Herbicidal Activity |
| --- | --- |
| 0 | None |
| 1 | Slight |
| 2 | Moderate |
| 3 | Severe |

TABLE I

Post-emergent Herbicidal Activity on Rice and Pre-emergent Herbicidal Activity on Barnyard Grass

| Compound | Rate lb./acre | Herbicidal Activity Rice | Barnyard Grass |
| --- | --- | --- | --- |
| 2',6'-diethyl-N-butoxy-methyl-alpha-chloro-acetanilide | 0.5 | 0.5 | 3 |
| | 0.25 | 0 | 3 |
| | 0.125 | 0 | 3 |
| | 0.062 | 0 | 2.5 |
| | 0.031 | 0 | 2.0 |
| 2',6'-diethyl-N-(2-butoxyethyl)-alpha-chloroacetanilide | 0.5 | 0 | 3 |
| | 0.25 | 0 | 3 |
| | 0.125 | 0 | 3 |
| | 0.062 | 0 | 3 |

The following example illustrates the selective utility of the compounds of the present invention in the inhibition of growth of barnyard grass in the presence of upland rice under over-head irrigation and subirrigation conditions:

Blue Bonnet rice seeds and barnyard grass seeds are sown at ½-inch depth in Ray silt loam soil in small plastic pots. The selective herbicide, in an acetone-water solvent, is applied to the surface at the desired rate. The pots are initially irrigated by either over-head irrigation or sub-irrigation, with subsequent irrigations in both cases being subirrigations. The pots are placed in a greenhouse for a period of time between 2½ to 3 weeks at 75° F and then observed for barnyard grass and rice inhibition. The results are recorded in Table II.

TABLE II.—PRE-EMERGENT HERBICIDAL ACTIVITY UNDER INITIAL OVER-HEAD OR SUBIRRIGATION

| | | Herbicidal activity, percent inhibition | | | |
| --- | --- | --- | --- | --- | --- |
| | | Over-head | | Subirrigation | |
| Compound | Rate, lb./acre | Rice | Barnyard | Rice | Barnyard grass |
| 2',6'-diethyl-N-butoxy-methyl-alpha-chloro-acetanilide | 0.5 | 0 | 95 | 5 | 98 |
| | 0.25 | 0 | 90 | 10 | 95 |
| | 0.125 | 0 | 85 | 0 | 90 |
| 2',6'-diethyl-N-(2-butoxyethyl)-alpha-chloroacetanilide | 1 | 0 | 99 | 0 | 99 |
| | 0.5 | 0 | 95 | 0 | 98 |
| | 0.25 | 0 | 83 | 0 | 93 |
| | 0.125 | 0 | 65 | 0 | 90 |

The herbicidal compositions of this invention comprise an active ingredient and one or more herbicidal adjuvant which can be solid or liquid extenders, carriers, diluents, conditioning agents, and the like. Preferred herbicidal compositions containing the active ingredients of this invention have been developed so that the active ingredients can be used to the greatest advantage to selectively inhibit the growth of barnyard grass in the presence of rice. The preferred compositions comprise certain wettable powders, aqueous suspensions, dust formulations, granules, emulsifiable oils and solutions in solvents. In general these preferred compositions can all contain one or more surface-active agents.

Surface-active agents which can be used in the herbicidal compositions of this invention are set out, for example, in Searle U.S. Pat. No. 2,426,417; Todd U.S. Pat. No. 2,655,447; Jones U.S. Pat. No. 2,412,510; and Lenher U.S. Pat. No. 2,139,276. A detailed list of such agents is also set forth by J. W. McCutcheon in "Soap and Chemical Specialties," November 1947, page 8,011 et seq., titled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general, less than 15 parts by weight of the surface-active agent is present per 100 parts by weight of the herbicidal composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides; long chain acid esters of sodium isothionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohols, sodium lignin sulfonates, polymeric alkyl naphthylene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely divided particles. The resulting concentrated aqueous suspension is characterized by its extremely small particle size, so that when diluted and sprayed coverage is very uniform.

Dusts are dense finely divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing, finely divided particulate extender. However, their performance is sometimes aided by the inclusion of a wetting agent such as those listed hereinbefore under settable powder compositions and convenience in manufacture frequently demands the inclusion of an inert, absorptive grinding aid. Suitable class of grinding aids are natural clays, diatomaceous earth and synthetic minerals derived from silica or silicate. Preferred grinding aids include attapulgite clay, diatomaceous silica, synthetic fine silica and synthetic calcium and magnesium dilicates.

The inert finely divided solid extender for the dusts can be of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock, and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surfactant. Suitable solvents for the active ingredient of this invention include hydrocarbons and water-immiscible ethers, esters or ketones. Suitable surfactants are anionic, cationic and non-ionic such as alkyl aryl polyethoxy alcohols, alkyl and alkyl aryl polyether alcohols, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely divied particulate extender. In order to aid leaching of the active ingredient from the particulate, the surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely divided clays such as kaolin clays, hydrated attapulgite, or bentonitic clays. These extenders are sprayed or blended with the active ingredient to form the herbicidal granules.

The mineral particles which are used in the granular herbicidal compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal compositions of this invention generally contain from about 1 part to about 30 parts by weight of the alpha-chloroacetanilide per 100 parts by weight of clay and 0 to about 5 parts by weight of wetting agent per 100 parts by weight of clay. The preferred herbicidal granular compositions contain from about 5 parts to about 25 parts by weight of active ingredient per 100 parts by weight of clay.

The selective herbicidal compositions of this invention can also contain other additaments, for example, fertilizers, other herbicides, pesticides and the like, used as adjuvant or in combination with any of the above-described adjuvants.

Herbicides which may be used in combination with the compounds of this invention include but are not limited to: triazine derivatives, such as 2-chloro-4-ethylamino-6-isopropylamino-s-triazine; 2,4-bis-(isopropylamino)-6-methoxy-s-triazine and 2-methylmercapto-4,6-bis-(isopropylamino)-s-triazine; urea derivatives such as 3-(3,4-dichlorophenyl)-1,1-dimethylurea and 3-(m-trifluoromethylphenyl)-1,1-dimethylurea and 3-(3,4-dichlorophenyl)-1-methoxy-1-methylurea; pyridylium derivatives such as 1:1'-ethylene-2,2-dipyridylium dihalide; acetanilides such as N-isopropyl-alpha-chloroacetanilide, and 2-chloro-2', 6'-diethyl-N-methoxymethyl acetanilide; acetamides such as N,N-diallyl-alpha-chloroacetamide, carbamates such as ethyl-N,N-di-n-propylthiolcarbamate, p-chlorobenzyl diethylthiolcarbamate, and 2,3dichloroallyl diisopropylthiolcarbamate; substituted uracils such as 5-bromo-3-sec-butyl-6-methyluracil, substituted anilines such as N,N-dipropyl-alpha, alpha, alpha-trifluoro-2,6-dinitro-p-toluidine; pyridazone derivatives such as 5-amino-4-chloro-2-phenyl-3-(2H)pyridazinone, phenols such as pentachlorophenol, sulfanilamides such as 3,5-dinitro-N[4], N[4]-dipropylsulfanilamide, oxadiazolines such as 2-tert-butyl-4-(2,4-dichloro-5-isopropyloxyphenyl)-5-oxo-1,3,4-oxadiazoline, ethers such as 2,4-dichlorophenyl-p-nitrophenylethyl and 2,4,6-trichlorophenyl-p-nitrophenylethyl, polymethyleneimine carbothiolates such as ethyl-1-hexamethyleneiminecarbothiolate and the like.

In the case of the floodland rice, the compound is applied to the soil or the flooded area after the transplant has been fixed. In the case of upland rice, the compound is applied after the rice has been planted. In both cases the compound is applied at a rate of about 0.062 to about 4 lbs. per acre. The amount used is depended upon the organic content of the soil. This is within the knowledge of those skilled in the art.

The term "plant" as used herein and in the appended claims means germinant seeds, emerging seedlings and established vegetation including the roots and above-ground portions.

While the illustrative embodiments of the invention have been described hereinbefore with particularity it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention inclusing all features which would be treated as equivalents thereof by those skilled in the art to which the invention pertains.

What is claimed is:

1. A method of inhibiting the growth of grasses in the presence of rice which comprises contacting the plant with a selective herbicidal effective amount of compound selected from the group consisting of
   a. 2',6'-diethyl-N-butoxymethyl-alpha-chloroacetanilide,
   b. 2',6'-diethyl-N-(2-butoxyethyl)-alpha-chloroacetanilide, and
   c. a mixture of (a) and (b).

2. A method in accordance with claim 1 in which the grass inhibited is barnyard grass.

3. A method in accordance with claim 2 in which the selective herbicidal effective compound is 2',6'-diethyl-N-butoxymethyl-alpha-chloroacetanilide.

4. A method in accordance with claim 2 in which the selective herbicidal effective compound is 2',6'-diethyl-N-(2-butoxyethyl)-alpha-chloroacetanilide.

5. A method in accordance with claim 2 in which the selective herbicidal effective compound is a mixture of 2',6'-diethyl-N-butoxymethyl-alpha-chloroacetanilide and 2',6'-diethyl-N-(2-butoxyethyl)-alpha-chloroacetanilide.

* * * * *